3,183,103
FORMING ONION POWDER BY SPRAY DRYING
Peter P. Noznick, Robert H. Bundus, and Anthony J. Luksas, Chicago, Ill., assignors to Beatrice Foods Co., Chicago, Ill., a corporation of Delaware
No Drawing. Filed Apr. 22, 1963, Ser. No. 274,865
11 Claims. (Cl. 99—204)

This invention relates to the preparation of onion powder.

The present application is a continuation-in-part of application Serial No. 176,130, filed February 27, 1962, and now abandoned.

It is an object of the present invention to prepare onion powder having a stronger flavoring effect than powder produced by conventional dehydration of the same onions.

Another object is to improve the drying characteristics of an onion puree.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by utilizing the procedures set forth herein.

The raw onions of the desired pungency and of any suitable variety are washed to remove any dirt or debris, rinsed and ground to the desired fineness or size in any suitable reduction equipment which will result in a puree containing particles of the size of approximately 0.040 inch or less. For best results the particles should pass through a 50 mesh sieve, i.e. have a size not over 0.012 inch.

The comminution should be fine enough that the viscosity of the puree is reduced to a level to permit formation of small spray droplets. Thus at a solids content with 9% to 25% by weight the viscosity of the puree should be between 10,000 centipoises and 20,000 centipoises.

The onions can be peeled, e.g. brush peeled to remove skin, or the peeling can be omitted. In the event the skins are retained the initial water washing should be more thorough.

The onion puree at room temperature or below is then mixed with 30–40% by weight of dextrin (as dry solids). The addition of the dextrin has been found to improve the drying characteristics of the puree, e.g. to make it easier to dry.

The puree is then spray dried in a conventional spray drier at a temperature between room temperature, e.g. 70° F. or lower, and a temperature of 155° F. The total time of treatment of the puree at elevated temperatures up to 150–155° F. should not be over 4 minutes.

It has been found that with Southport White Globe onions it is critical to heat the onion puree containing the dextrin at a temperature of 150–155° F. for 3–4 minutes, e.g. by use of a suitable heat exchanger of the tubular type. The puree is then spray dried, preferably at room temperature although as indicated higher temperatures can be employed providing the total time at temperatures of 150–155° F. is not over 4 minutes. If Southport White Globe onions do not receive the treatment at 150–155° F. they develop an undesirable red color.

With onions other than Southport White Globe onions, e.g. Yellow Globe onions, there is no problem of color formation and the heating of the puree containing dextrin to 150–155° F. can be omitted.

The powder produced by this method is at least 20% stronger in its flavoring effect than powder produced by conventional dehydration of the same onions.

When the heat treatment is employed it destroys all pathogenic bacteria and greatly reduces the bacterial population.

*Example 1*

Southport White Globe onions were washed and brush peeled, rinsed and ground to below 0.04 inch. The onion puree at room temperature was mixed with 35% by weight of dextrin (as dry solids) and heated at 153° F. for 4 minutes. The puree was then cooled to room temperature (70° F.) and spray dried.

*Example 2*

Yellow Globe onions were thoroughly washed and ground to below 0.012 inch. The onion puree at room temperature was mixed with 35% by weight of dextrin (as dry solids) and spray dried.

The dextrin treated puree can be centrifuged or subjected to other mechanical separation means resulting in a pulp and a juice. In either case the separated pulp is then roller dried to a powder and the separated juice is frozen. The temperature at the time of such separation can be from room temperature up to an elevated temperature of 150° F. to 155° F.

Thus, a puree of Southport White Globe onions containing 35% dextrin was centrifuged at 153° F. to separate the pulp from the juice. The separated juice was frozen and then centrifuged to remove water in the form of ice.

In this manner the concentration of the onion flavoring principle was increased 2–4 times. The concentrated juice can then be spray dried with up to 80% of dextrin. In a specific example 60% dextrin was employed. The resultant powder was blended with the powdered pulp which has been produced by roller drying. It is understood, of course, that in referring to the frozen juice we mean the juice has been returned to a liquid state as by thawing so that it can then be spray dried as described for mixture with the powder obtained from the pulp so as to produce the aforesaid blended mixture.

When a concentrated puree is desired, the pulp and the concentrated juice as produced above may be reblended, i.e., reconstituted, without dehydration, i.e., without roller drying the pulp and spray drying the concentrate, the pulp and concentrate being merely mixed together and 10% of sodium chloride being added as a preservative.

We claim:

1. The process of treating raw onions which comprises washing the same, rinsing with water, grinding and forming a puree comprising pulp and juice, adding about 30 to 40% dextrin to such puree to form a dextrin containing puree, heating the mixture to about 150 to 155° F. for 3 to 4 minutes, cooling and spray drying.

2. The process according to claim 1 in which the pulp is separated from the juice in the dextrin containing puree by agitation and the juice is spray dried.

3. The process according to claim 2 wherein the pulp is roller dried.

4. The process of treating raw onions other than Southport White Globe onions which comprises washing the same, rinsing with water, grinding and forming a puree, adding about 30 to 40% dextrin to such puree, separating the pulp and juice from the puree by mechanical separation, drying the pulp, and freezing the juice to form ice crystals, and removing the ice crystals.

5. The process according to claim 4 wherein the frozen juice is centrifuged to remove ice crystals and spray dried.

6. The process according to claim 4 wherein the separated pulp is roller dried.

7. The process according to claim 5 wherein the separated pulp is roller dried and mixed with the spray dried juice.

8. A process according to claim 1 wherein the onions are Southport White Globe onions.

9. A process according to claim 4 wherein the grinding is to an extent to reduce the particle size to not over 0.012 inch.

10. A process according to claim 4 wherein the onions are Yellow Globe onions.

11. The process of treating raw onions other than Southport White Globe onions which comprises washing the same, grinding and forming a puree, adding about 30 to 40% dextrin to said puree and spray drying.

References Cited by the Examiner

UNITED STATES PATENTS

| 1,361,239 | 12/20 | Fleming | 99—206 |
| 2,557,155 | 6/51 | Strashun et al. | 99—206 |
| 2,605,188 | 7/52 | Baker | 99—193 X |

FOREIGN PATENTS 17,141/34  11/34  Australia.

A. LOUIS MONACELL, *Primary Examiner.*

ABRAHAM WINKELSTEIN, *Examiner.*